United States Patent
Conole

(10) Patent No.: US 10,638,398 B2
(45) Date of Patent: Apr. 28, 2020

(54) PACKET TUNNELING IN A WIRELESS NETWORK

(71) Applicant: Red Hat, Inc., Raleigh, NC (US)

(72) Inventor: Aaron Conole, Lowell, MA (US)

(73) Assignee: Red Hat, Inc., Raleigh, NC (US)

( * ) Notice: Subject to any disclaimer, the term of this patent is extended or adjusted under 35 U.S.C. 154(b) by 122 days.

(21) Appl. No.: 15/054,836

(22) Filed: Feb. 26, 2016

(65) Prior Publication Data

US 2017/0250837 A1    Aug. 31, 2017

(51) Int. Cl.
*H04W 40/02* (2009.01)

(52) U.S. Cl.
CPC .................... *H04W 40/02* (2013.01)

(58) Field of Classification Search
CPC ................ H04L 12/4633; H04L 12/46
See application file for complete search history.

(56) References Cited

U.S. PATENT DOCUMENTS

| 8,693,367 | B2 | 4/2014 | Chowdhury et al. | |
|---|---|---|---|---|
| 2010/0027533 | A1 | 2/2010 | Kant et al. | |
| 2011/0116499 | A1 | 5/2011 | Lim et al. | |
| 2012/0076099 | A1* | 3/2012 | Yin | H04L 12/4633 370/329 |
| 2014/0153572 | A1* | 6/2014 | Hampel | H04L 12/6418 370/392 |
| 2014/0226642 | A1 | 8/2014 | Haddad et al. | |
| 2014/0241247 | A1* | 8/2014 | Kempf | H04L 12/4633 370/328 |

(Continued)

FOREIGN PATENT DOCUMENTS

| EP | 2843885 A1 | 3/2015 |
|---|---|---|
| WO | WO2014/169470 A1 | 10/2014 |

(Continued)

OTHER PUBLICATIONS

Banerjee, A., et al., "MOCA: A Lightweight Mobile Cloud Offloading Architecture," ACM, 2013, http://www.cs.umd.edu/~slee/pubs/moc3-mobiarch13.pdf.

(Continued)

*Primary Examiner* — Jeffrey M Rutkowski
*Assistant Examiner* — Chae S Lee
(74) *Attorney, Agent, or Firm* — Kilpatrick Townsend & Stockton LLP

(57) ABSTRACT

A communication pathway or tunnel can be established between a service node (or other similar node) of a wireless network and an external network using software-defined networking. Packet-based communications can be routed through the wireless network using the communication pathway without requiring a specific node, such as a gateway node, for interfacing with the external network. The software-defined networking system can include program code executed by a computing device to monitor communications in the wireless network and identify a communication that includes a request to establish a communication pathway to the external network. In response, the program code can reprogram network hardware-devices to establish the communication pathway and allow packet communications to be exchanged between the wireless network and the external network via the communication pathway.

20 Claims, 4 Drawing Sheets

(56) References Cited

U.S. PATENT DOCUMENTS

| | | | |
|---|---|---|---|
| 2016/0295476 A1* | 10/2016 | Bi | H04W 36/12 |
| 2017/0079000 A1* | 3/2017 | Xue | H04W 8/082 |
| 2017/0195288 A1* | 7/2017 | Libby | H04W 12/06 |
| 2017/0199751 A1* | 7/2017 | Sama | G06F 9/45533 |
| 2018/0324087 A1* | 11/2018 | Li | H04W 8/12 |

FOREIGN PATENT DOCUMENTS

| | | |
|---|---|---|
| WO | WO2014/198020 A1 | 12/2014 |
| WO | WO2015/021799 A1 | 2/2015 |
| WO | WO2015/106827 A1 | 7/2015 |

OTHER PUBLICATIONS

Karimzadeh, M., et al., "Applying SDN/Open Flow in Virtualized LTE to support Distributed Mobility Management (DMM)," Dept. of Computer Science and the Electrical Engineering University of Twente, The Netherlands http://doc.utwente.nl/90548/1/Mortez3_Karimzadeh_DMM_Position_Paper_Camera_Ready_Final_Version.pdf.

Heinonen, J., et al., "Dynamic tunnel switching for SDN-based cellular core networks," AllThingsCellular '14, Proceedings of the $4^{th}$ workshop on All things celllar: operations, applications & challenges, ACM, New York, 2014, pp. 27-32 http://dl.acm.org/citation.cim?id=2627587.

"Smore: Software-Defined Networking Mobile Offloading Architecture," The University of Utah, Aug. 25, 2014, http://www.cs_utah.edu/~jmanbel/paper/smore_slide.pdf.

"GSM (Global System for Mobile Communications)," Global Telecoms Insight, Jan. 22, 2016, http://www.mobilecomms-technology.com/projects/gsm.

"7 Essentials of Software-Defined Networking," Networking, Nov. 19, 2013, White Paper.

"Cisco 7600 Gateway GPRS Support Node (Cisco)," Red River, Jan. 30, 2016, http://www.ciscobyredriver.com/sw/swchannel/productcatalogcf_v2/internet/model.asp?ProductMasterID=2038399&ParentID=284169&SWI,=1.

"Cisco GGSN Gateway GPRS Support Node," Products & Services—Cisco, Feb. 8, 2016, http://www.cisco.com/c/en/us/products/wireless/ggsn-gateway-gprs-support-node/index.html.

"General Packet Radio Service," Wikipedia, Jan. 21, 2016, https://en.wikipedia.org/wiki/General_Packet_Radio_Service.

"GPRS core network," Wikipedia, Jan. 21, 2016, https://en.wikipedia.org/wiki/GPRS_core_network.

"GPRS—PDP Context," Jan. 30, 2016, http://www.tutorialspoint.com/gprs_pdp_context.htm.

"GPRS Procedures (General Packet Radio Service) Part 2," Jan. 30, 2016, http://what-when-how.com/roaming-in-wireless-networks/gprs-procedures-general-radio-service-part-2/.

"GPRS Tunneling Protocol (GTP) Overview," Jan. 30, 2016, http://www.juniper.net/techpubs/en_US/juncs-mobility12.1/topics/concept/gtp-mobility-protocols-overview.html.

"GPRS," Jan. 21, 2016, blueadmiral.com/Communications/comms/gprs.shtml.

"GSM," Wikipedia, Jan. 31, 2016, http://en.wikipedia.org/wiki/GSM.

"What is OpenFlow?," Jan. 31, 2016, http://whatis.techtarget.com/definition/OpenFlow.

"Voice Coding Chat Application Project," Jan. 30, 2016, http://www.123eng.com/projects/gsm_architecture.html.

\* cited by examiner

PACKET TUNNELING IN A WIRELESS NETWORK

TECHNICAL FIELD

The present disclosure relates generally to telecommunications. More specifically, but not by way of limitation, this disclosure relates to packet tunneling in a wireless network.

BACKGROUND

Wireless networks can communicate with mobile devices, such as mobile phones, using data packets. For example, a wireless network can receive a data packet from a mobile device and route the data packet through a private networking infrastructure of the wireless network to a destination specified in the data packet. The destination can be internal or external to the private networking infrastructure. For example, the destination can be a location on an external network, such as the Internet. Routing data packets to and from an external network can allow for various mobile features, such as mobile web browsing, to be implemented.

Wireless networks can use one or more packet-based services, such as the general packet radio service (GPRS), to route data packets to their destinations. These packet-based services can use a series of nodes to transmit data packets through a wireless network. For example, a GPRS-based wireless network can include a packet service support node and a gateway support node. The packet service support node can receive data packets from a mobile device, process them, and transmit them to the gateway support node. The gateway support node can receive the data packets, further process them, and forward them to a destination on an external network. But such nodes typically include electronic devices that are specially configured with particular hardware and software for performing specific functions, such as creating, receiving, or transmitting data packets, within the wireless network.

DETAILED DESCRIPTION

Figure 1:
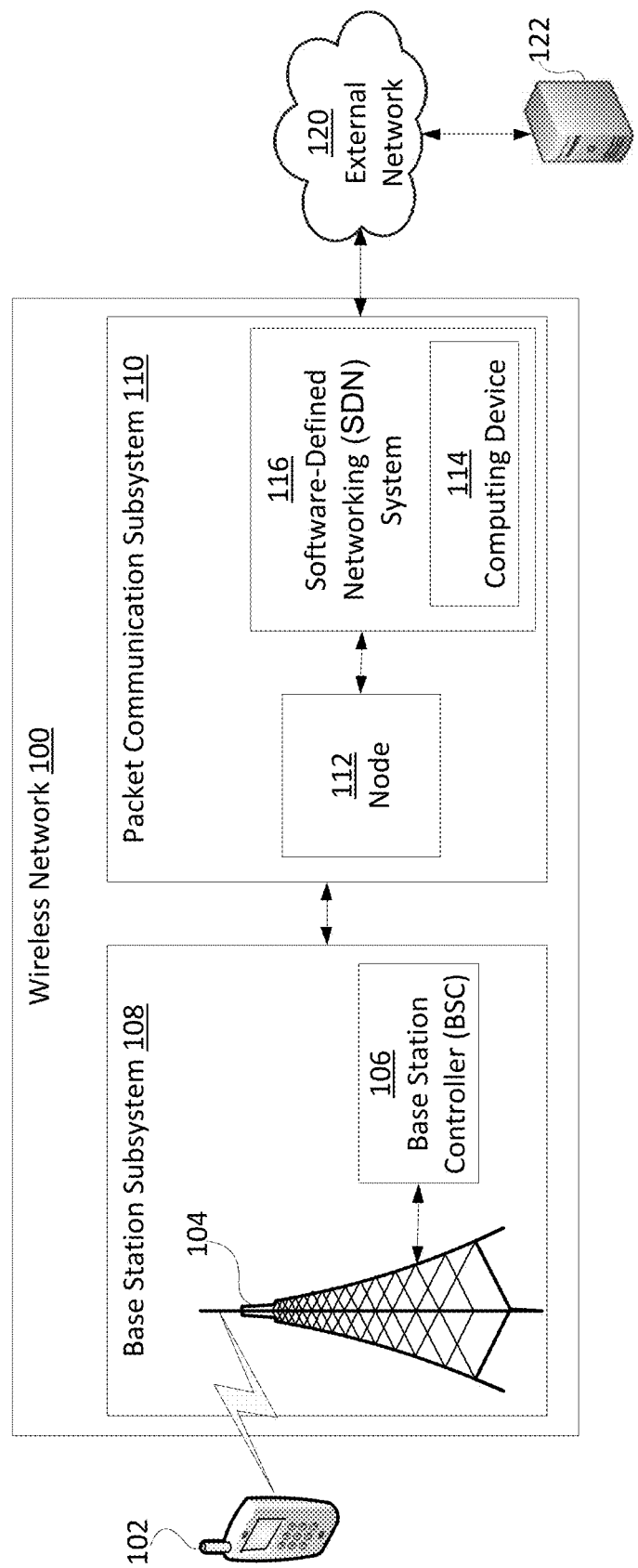
FIG. 1 is an example of a wireless network that uses a software-defined networking (SDN) system for establishing a communication pathway between a mobile device and an external network according to some aspects.

Certain aspects and features of the present disclosure relate to establishing a communication pathway between a wireless network and an external network, such as the Internet, using a packet service support node interfacing with a software-defined networking (SDN) system. The SDN system can include a computing device executing software for programming and configuring one or more programmable network hardware-devices to control the flow of data packets through the wireless network. The combination of components of the SDN system can be used to generate one or more tunnels (e.g., data packet tunnels) between the packet service support node and the external network for use as the communication pathway between the wireless network and the external network. This can reduce or eliminate the need for the gateway support node in the wireless network.

Typically, gateway support nodes are physically large, expensive, and require specially configured hardware. Conversely, an SDN system can be programmable, customizable, and implemented using physically smaller and cheaper hardware. Thus, replacing the gateway support node with the SDN system can result in reduced costs and improved flexibility for the wireless network.

After the communication pathway is established, it may be desirable for a mobile device (e.g., wirelessly communicating with the wireless network) to communicate with external network (via the communication pathway). For example, a user of the mobile device may wish to use the mobile device to download content from the external network. But the mobile device and the external network may use different data-packet formats. To accommodate for the different data-packet formats, the SDN system can translate or transform data packets between the data packet formats to enable communication between the mobile device and the external network.

For example, the mobile device can transmit data packets in a particular data-packet format, such as the GTP-U format, that is incompatible with the external network. Data packets received by the wireless network from the mobile device can be translated or transformed into an appropriate format for use with the external network. One method of translating or transforming data packets into the appropriate format for use with the external network is by removing one or more packet headers (e.g., a GTP-U header) that are specific to the data packet format used by the mobile device. Additionally or alternatively, the wireless network can prepend one or more new headers specific to the data packet format used by the external network. The wireless network can then transmit the transformed data packets to the external network. Likewise, data packets received by the wireless network from the external network can be translated or transformed into an appropriate format (e.g., by adding or removing one or more packet headers) for use by the mobile device. The wireless network can then transmit the transformed data packets to the mobile device.

These illustrative examples are given to introduce the reader to the general subject matter discussed here and are not intended to limit the scope of the disclosed concepts. The following sections describe various additional features and examples with reference to the drawings in which like numerals indicate like elements but, like the illustrative examples, should not be used to limit the present disclosure.

FIG. 1 is an example of a wireless network 100 that uses a SDN system 116 for establishing a communication pathway between a mobile device 102 and an external network 120 according to some aspects. The SDN system 116 can configure one or more programmable network devices, as discussed in greater detail below, to establish a communication pathway between a node 112 of the wireless network 100 and the external network 120. Thereafter, data may be able to flow between the mobile device 102 and the external network 120 via the communication pathway, without involving a gateway support node.

The wireless network 100 includes a packet communication subsystem 110 and a base station subsystem 108 that, combined, allow a mobile device 102 to access the wireless network 100 and communicate with an external network 120, such as the Internet. The packet communication subsystem 110 includes components for implementing packet-based communication through the wireless network 100. For example, the packet communication subsystem 110 can include components for implementing at least a portion of the general packet radio service (GPRS). As shown in FIG. 1, the packet communication subsystem 110 includes one or more nodes, such as node 112. The node 112 can include a specially configured network-hardware component that can receive, send, or forward data packets through the wireless network 100. Examples of the node 112 can include a packet service support node, a support GPRS service node, a serving gateway, or any combinations of these. The node 112 can route data packets to and from mobile devices 102 within a particular geographical region associated with the node 112.

The packet communication subsystem 110 also includes a SDN system 116 with a computing device 114. The computing device 114 can communicate with the node(s) 112 and execute program code for controlling the SDN system 116. In some examples, the SDN system 116 can receive a request from the node 112 and establish a communication pathway (e.g., a tunnel) between the node 112 and the external network 120 in response to the request. Data packets can then be transmitted between the packet communication subsystem 110 and the external network 120 via the communication pathway. In some examples, the computing device 114 can physically replace and perform the functions of, for example, a gateway support node of a GPRS system. This can reduce an overall cost of the wireless network 100 and improve the flexibility of the wireless network 100, for example, as discussed in greater detail with respect to FIG. 3.

Although the computing device 114 is depicted in FIG. 1 as being within the packet communication subsystem 110, the computing device 114 can alternatively be part of a cloud-computing environment. In one example, the computing device 114 can include a cloud server configured to implement one or more features of the present disclosure. The cloud-computing environment may allow for the various features of the present disclosure to be implemented using generic hardware and at lower cost.

The base station subsystem 108 includes components for facilitating wireless communication with a mobile device 102. The base station subsystem 108 can include a base station controller 106. The base station controller 106 can operate an associated base transceiver station 104. In some examples, the base station controller 106 can allocate a radio channel to the base transceiver station 104. For example, the mobile device 102 can request a radio channel from the base station controller 106 for use in wireless communication. The base station controller 106 can assign a particular radio channel to the mobile device 102 to allow the mobile device 102 to wirelessly communicate with the wireless network 100. Thereafter, the mobile device 102 can communicate with the wireless network 100 via the assigned radio channel. In some examples, the base station controller 106 can control handovers between multiple base transceiver stations; control data flow between one or more base transceiver stations and the packet communication subsystem 110; or both. For example, the base station controller 106 can receive data packets from the mobile device 102 and control a flow of the data packets to the packet communication subsystem 110. Additionally or alternatively, the base station controller 106 can receive data packets from the packet communication subsystem 110 and control a flow of the data packets to the mobile device 102.

In some examples, the mobile device 102 can transmit a request to the base station subsystem 108 after connecting to the wireless network 100. The base station subsystem 108 can receive the request and transmit the request to the SDN system 116 of the packet communication subsystem 110. In response to the request, the SDN system 116 can establish a communication pathway between the node 112 and the external network 120 for use by the mobile device 102. The SDN system 116 can transmit a response back to the mobile device 102, via the base station subsystem 108, indicating that the communication pathway has been established. Thereafter, the mobile device 102 can transmit data packets to the packet communication subsystem 110 (via the base station subsystem 108), which in turn can route the data packets to the external network 120 via the communication pathway. The external network 120 can additionally or alternatively transmit data packets to the packet communication subsystem 110 via the communication pathway. The packet communication subsystem 110 can receive the data packets and route the data packets to the mobile device 102 via the base station subsystem 108.

In some examples, the packet communication subsystem 110 can translate the data packets received from the mobile device 102 into a format usable by the external network 120. Translating the data packets can include encapsulating the data packets with packet headers that are compatible with the external network 120 or stripping away packet headers that are incompatible with the external network 120. The packet communication subsystem 110 can also translate data packets received from the external network 120 into a format usable by the mobile device 102 and route the data packets to the mobile device 102. Translating data packets between formats may allow the mobile device 102 to engage in various functions using the external network. For example, the mobile device 102 may be able to transmit digital voice data to the external network, download content from the external network, or communicate with another electronic device 122 (e.g., a server) via the external network.

Although FIG. 1 shows a mobile device 102, a base transceiver station 104, and base station controller 106, some examples can include multiple mobile devices, multiple base transceiver stations, multiple base station controllers, or any combinations of these. Further, although FIG. 1 depicts the mobile device 102 as a phone, the mobile device 102 may alternatively include a tablet, an e-book, a laptop computer, or another electronic device.

In some examples, the wireless network 100 can include a cellular network or any other suitable wireless network. The wireless network 100 may be able to communicate with external devices or systems via one or more wireless-network communication standards, such as the Global System for Mobile Communication (GSM) standard, the Universal Mobile Telecommunications System (UMTS) standard, or the Long Term Evolution (LTE) standard.

Figure 2:
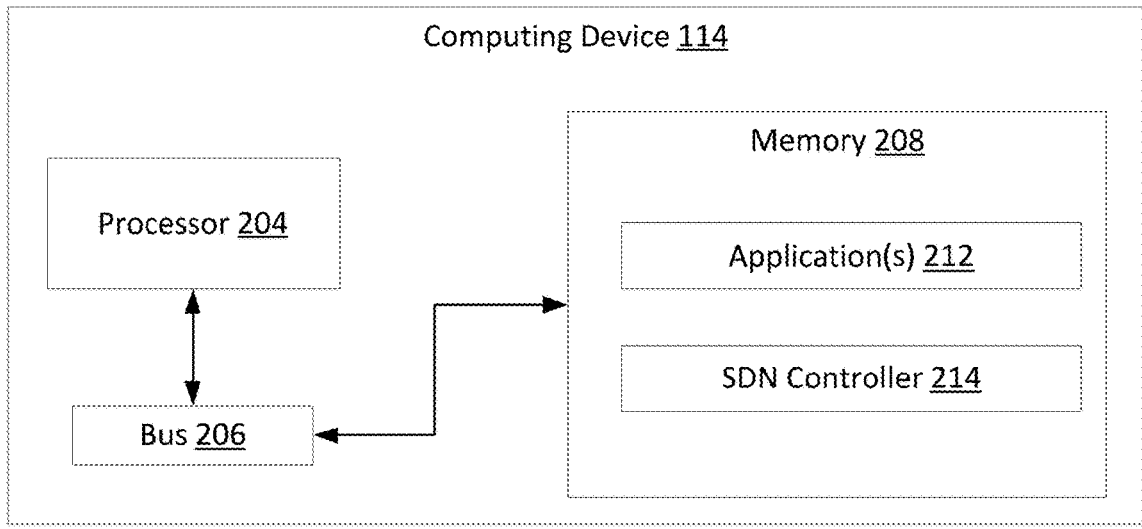
FIG. 2 is a block diagram of an example of a computing device usable for executing program code for controlling a SDN system according to some aspects.

FIG. 2 is a block diagram of an example of a computing device 114 usable for executing program code for controlling a SDN system according to some aspects. The computing device 114 can include a processor 204, a memory 208, and a bus 206. In some examples, the components shown in FIG. 2 (e.g., the processor 204, the bus 206, and the memory 208) can be integrated into a single structure. For example, the components can be within a single housing. In other examples, the components shown in FIG. 2 can be distributed (e.g., in separate housings) and in electrical communication with each other.

The processor 204 can execute one or more operations for implementing some examples. The processor 204 can execute instructions stored in the memory 208 to perform the operations. The processor 204 can include one processing device or multiple processing devices. Non-limiting examples of the processor 204 include a Field-Programmable Gate Array ("FPGA"), an application-specific integrated circuit ("ASIC"), a microprocessor, etc.

The processor 204 can be communicatively coupled to the memory 208 via the bus 206. The non-volatile memory 208 may include any type of memory device that retains stored information when powered off. Non-limiting examples of the memory 208 include electrically erasable and programmable read-only memory ("EEPROM"), flash memory, or any other type of non-volatile memory. In some examples, at least some of the memory 208 can include a medium from which the processor 204 can read instructions. A computer-readable medium can include electronic, optical, magnetic, or other storage devices capable of providing the processor 204 with computer-readable instructions or other program code. Non-limiting examples of a computer-readable medium include (but are not limited to) magnetic disk(s), memory chip(s), ROM, random-access memory ("RAM"), an ASIC, a configured processor, optical storage, or any other medium from which a computer processor can read instructions. The instructions can include processor-specific instructions generated by a compiler or an interpreter from code written in any suitable computer-programming language, including, for example, C, C++, C #, etc.

The memory 208 can include program code for one or more applications 212 usable with the SDN system, an SDN controller 214, or both. Further detail about the applications 212, the SDN controller 214, and the SDN system is provided below with respect to FIG. 3.

Figure 3:
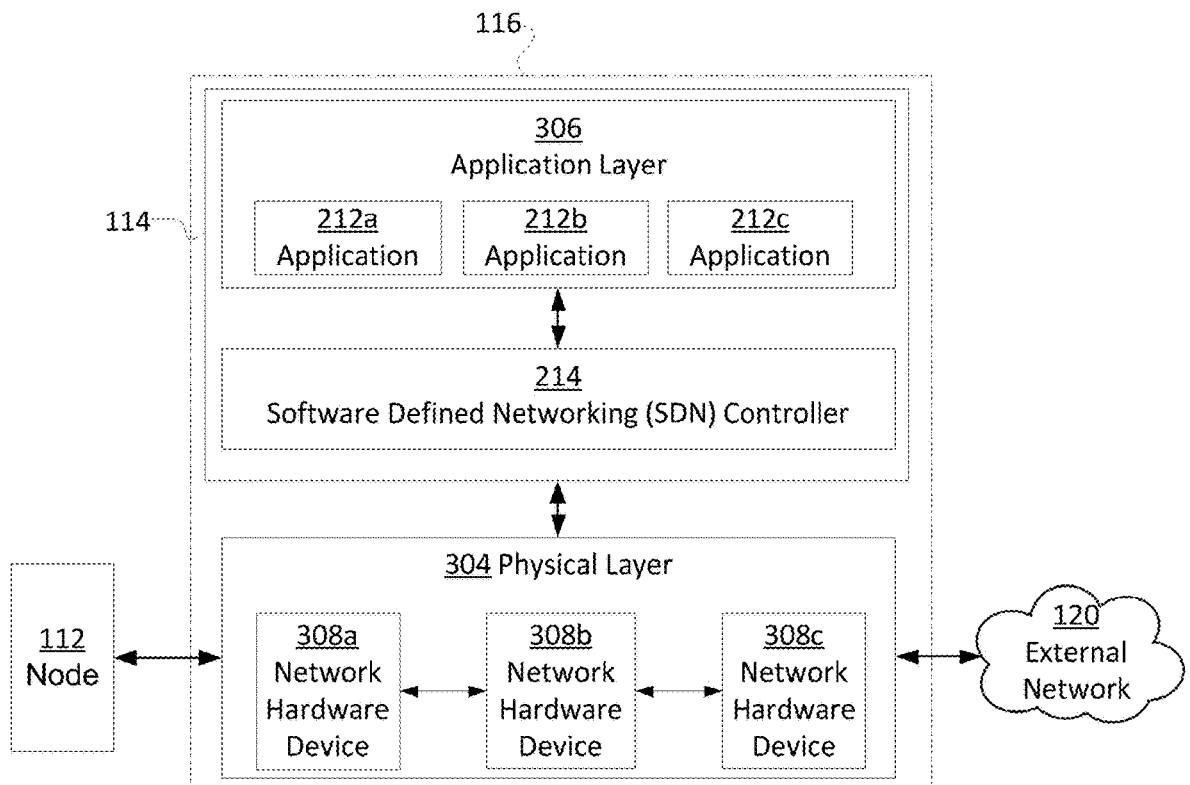
FIG. 3 is a block diagram of an example of a SDN system for use in a wireless network according to some examples.

FIG. 3 is a block diagram of an example of a SDN system 116 for use in a wireless network according to some examples. The SDN system 116 can separate the control logic that makes decisions about where data packets are sent in a wireless network from the underlying network hardware devices 308a-c, such as switches or routers, that actually route the data packets to specified destinations. This separation can allow for applications 212a-c to control the flow of data through the wireless network, without a human having to physically move or rewire individual network hardware devices 308a-c. For example, an application 212a executing on the computing device 114 can be controlled by a network operator to program the network hardware devices 308a-c in a particular way to control network traffic in a specified manner.

As shown in FIG. 3, the SDN system 116 includes a SDN controller 214, in communication with an application layer 306 and a physical layer 304. The SDN controller 214 can interface between the application layer 306 and the network hardware devices 308a-c in the physical layer 304. The SDN controller 214 can communicate with the physical layer 304 using a protocol, such as the OpenFlow protocol. For example, the SDN controller 214 can receive data via the protocol from the physical layer 304 and transmit the data to the application layer 306. The SDN controller 214 can additionally or alternatively receive data from the application layer 306 and transmit the data to the physical layer 304 via the protocol.

The application layer 306 can include one or more applications 212a-c. The applications 212a-c can include control logic (e.g., program code) for establishing a communication pathway between the node 112 and an external network 120. For example, an application 212a can receive a flow activation request from the node 112. In response, the application 212a can use the SDN controller 214 to program the network hardware devices 308a-c with particular flow tables that establish a tunnel between the node 112 and the external network 120. A flow table can include one or more flow entries, with each flow entry specifying a communication pathway for a particular data-packet type from a network hardware device 308a to a destination, such as another network hardware device 308b or the external network 120. A flow entry can additionally specify processes to be performed on data packets associated with the flow entry. For example, a flow entry can specify that data packets associated with the flow entry should be encapsulated, decapsulated, copied, or any combination of these. The network hardware devices 308a-c may be programmable and, in this example, can receive the flow table, store the flow table in memory, and act upon data packets associated with the flow entry in accordance with the flow entry. After establishing the tunnel between the node 112 and the external network 120, in some examples, the application 212a can transmit a flow activation response to the node 112. The flow activation response can indicate to the node 112 that the tunnel was, or was not, established. A more detailed example of a process for establishing such a communication pathway is shown in FIG. 4.

Figure 4:
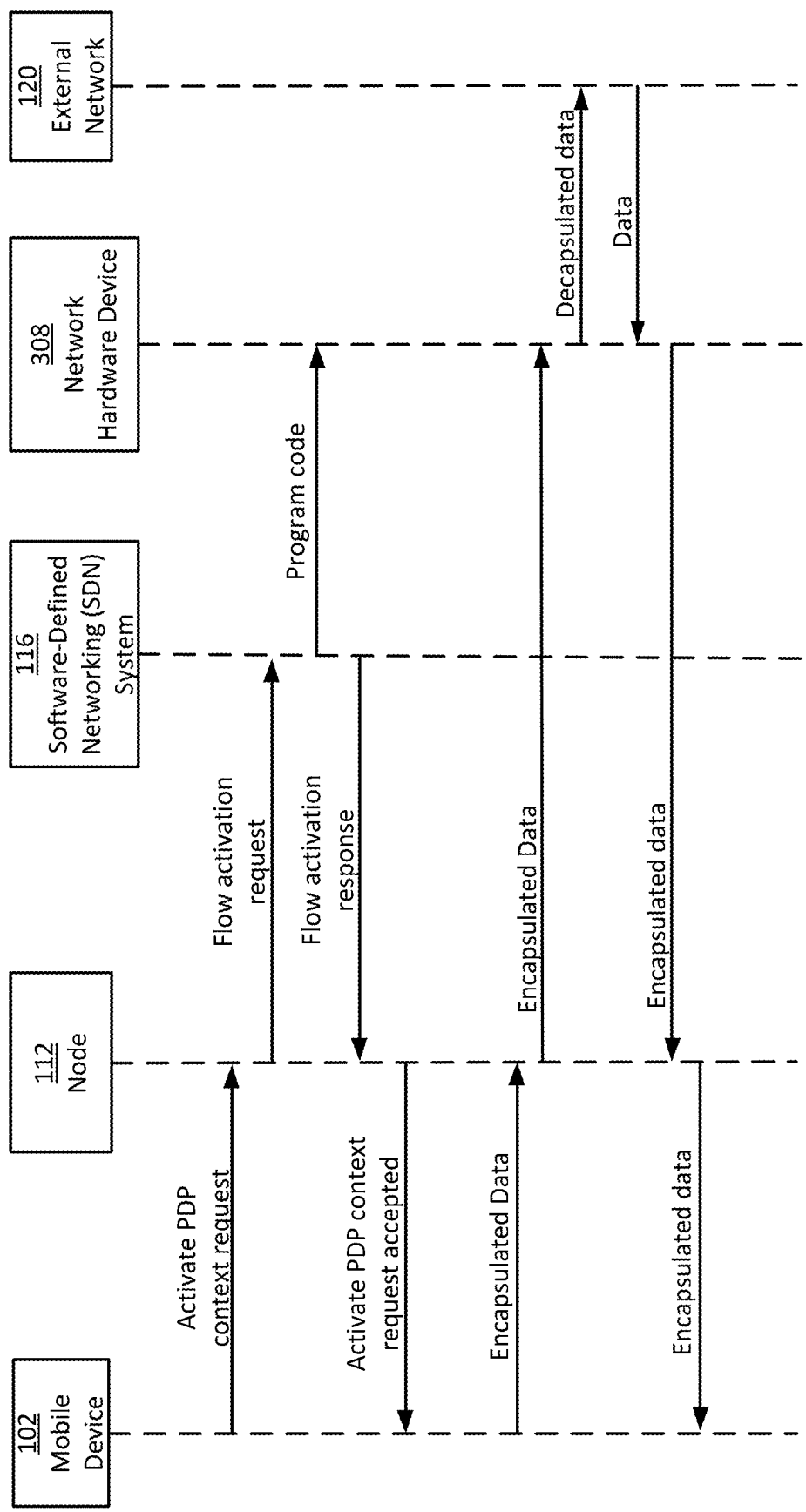
FIG. 4 is a sequence diagram of an example of using a node of a wireless network in conjunction with a SDN system to establish a communication pathway between a mobile device and an external network according to some aspects.

FIG. 4 is a sequence diagram of an example of using a node 112 of a wireless network in conjunction with a SDN system (e.g., executing on computing device 114) to establish a communication pathway between a mobile device 102 and an external network 120 according to some aspects. As discussed in greater detail below, the mobile device 102 can transmit data to the node 112, which in turn can transmit data to the SDN system 116, to establish the communication pathway between the mobile device 102 and the external network 120. Thereafter, the mobile device 102 and the external network 120 can communicate data to one another via the communication pathway.

For example, a user of a mobile device 102 can activate an application that attempts to initiate data communication with a remote device located on the external network 120. To facilitate the data communication, the mobile device 102 can request, from the wireless network, a radio channel to use in communicating with the wireless network. After a radio channel is allocated to the mobile device 102, the mobile device 102 may transmit a request to the node 112. The request can take the form of an activate packet-data-protocol (PDP) context request and may be for obtaining access to the external network 120 through the wireless network. In some examples, the node 112 can receive the activate PDP context request and determine, based on the activate PDP context request, that a mobile device 102 is attempting to communicate data to the remote device.

In some examples, in response to receiving the activate PDP context request, the node 112 can transmit a flow activation request to the SDN system 116 based on data contained in the activate PDP context request. For example, the node 112 can transmit the flow activation request to the SDN controller 214 of the SDN system 116 shown in FIG. 3. In some examples, the flow activation request can indicate that data transmitted through a particular communication pathway (e.g., tunnel) established by the SDN system 116 should undergo specific processing. For example, the SDN system 116 can determine that, based on the flow activation request, data transmitted through a communication pathway between the mobile device 102 and the external network 120 should be decapsulated prior to being forwarded to the external network 120.

In some examples, the SDN system 116 can receive the flow activation request and, in response to the flow activation request, transmit data to one or more network hardware devices, such as network hardware device 308, to establish a communication pathway (e.g., tunnel) between the node 112 and the external network 120. The data can include a flow table, flow entry, program code, or any combinations of these. In some examples, the SDN system 116 can transmit data to a network hardware device 308 along the communication pathway to configure the network hardware device 308 so that specific processing is performed on data passing through the communication pathway. For example, the SDN system 116 can configure the network hardware device 308 such that data transmitted from the mobile device 102 to the external network 120 is encapsulated, data transmitted from the external network 120 to the mobile device 102 is decapsulated, or both as the data passes through the network hardware device 308. In some examples, the SDN system 116 can transmit a flow activation response to the node 112 indicating that the communication pathway was successfully established or unsuccessfully established.

The node 112 can receive the flow activation response and, in response to the flow activation response, transmit data indicating that the activate PDP context request was successfully accepted or was not accepted. In some examples, the flow of data between the mobile device 102 and the node 112 is substantially the same as in a traditional GPRS system. This can allow for some examples to be implemented without modifying hardware or software of the mobile device 102.

With the communication pathway established between the mobile device 102 and the external network 120, the mobile device 102 may be able to transmit data to the external network 120 via the communication pathway. For example, the mobile device 102 may transmit data in the form of GTP-U packets to the node 112. The node 112 can receive the GTP-U packets and transmit the GTP-U packets to a network hardware device 308 along the communication pathway established by the SDN system 116. The network hardware device 308 can decapsulate the GTP-U packets (e.g., by stripping the GTP-U header) and forward the decapsulated packets to the external network 120.

In some examples, the external network 120 can transmit data to the mobile device 102 via the communication pathway established by the SDN system 116. For example, the external network 120 can transmit data via a network hardware device 308 associated with the communication pathway to the node 112. The network hardware device 308 can encapsulate the data (e.g., to include a GTP-U header) and forward the encapsulated data to the node 112. The node 112 can receive the encapsulated data and transmit the encapsulated data to the mobile device 102.

Figure 5:
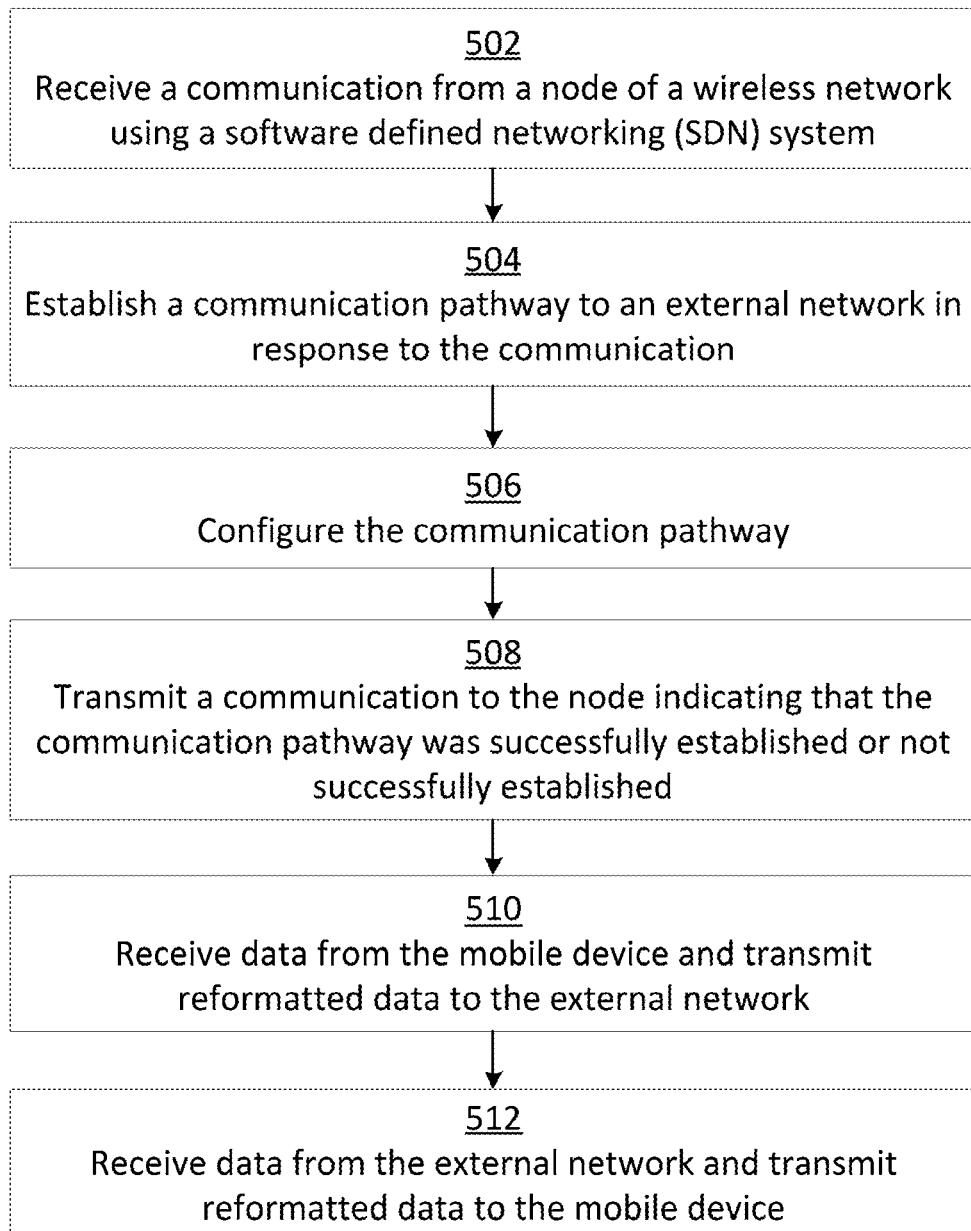
FIG. 5 is a flow chart showing an example of a process for using a node of a wireless network in conjunction with a SDN system to establish a communication pathway between a mobile device and an external network according to some aspects.

FIG. 5 is a flow chart showing an example of a process for using a node of a wireless network in conjunction with a SDN system to establish a communication pathway between a mobile device and an external network according to some aspects. Some examples can include more, fewer, or different steps than the steps depicted in FIG. 5. The steps below are described with reference to components described above with regard to FIG. 1.

In block 502, the SDN system 116 can receive a communication from a node 112 of a packet communication subsystem of a wireless network 100. For example, the SDN system 116 can receive a communication from a support GPRS service node of a GPRS system of the wireless network 100. In some examples, the communication can include a request to establish a communication pathway between the node 112 and an external network 120.

The communication can be transmitted to a physical layer associated with the SDN system 116. The physical layer can communicate one or more parameters of the communication to a SDN controller associated with the SDN system 116.

In block 504, the SDN system 116 can establish a communication pathway (e.g., between the mobile device 102 and the external network 120 via the node 112) in response to the communication from the node 112. In some examples, the SDN system 116 can establish the communication pathway by creating or modifying a flow table. For example, the SDN system 116 can insert a flow entry into the flow table. The flow entry can include a tunnel endpoint identifier (TEID), an IP address, a user datagram protocol (UDP) port number, one or more processes (e.g., encapsulation or decapsulation) to be performed on data packets associated with the flow entry, or any combination of these. The SDN system 116 can then transmit the flow table to one or more network hardware devices, such as Openflow switches or routers, to configure the network hardware devices to operate in a manner dictated by the flow entry.

In block 506, the SDN system 116 can configure the communication pathway to implement one or more processes on data flowing through the communication pathway. For example, the SDN system 116 can configure a new flow entry or an existing flow entry of a flow table to include one or more processes to be performed on data packets associated with the flow entry. The SDN system 116 can then transmit the flow table to one or more network hardware devices to configure the network hardware devices to perform the processes on data packets associated with the flow entry.

In block 508, the SDN system 116 can transmit a communication to the node 112 indicating that the communication pathway was successfully established or not successfully established. In some examples, the communication can include a flow activation response.

For example, the SDN system 116 can determine that a flow entry was successfully included in a flow table, that the flow table was successfully transmitted to one or more network hardware devices, or both. The SDN system 116 may make one or both of these determinations based on communications from the network hardware devices. Based on one or both of these determinations, the SDN system 116 can determine that the communication pathway was successfully established. The SDN system 116 can then transmit a communication to the node 112 indicting that the communication pathway was successfully established. In some examples, the node 112 can receive the communication and determine, based on the communication, whether the communication pathway was, or was not, successfully established.

In block 510, network hardware devices of the wireless network 100 can receive data from the mobile device 102, access information (e.g., a flow table) stored in memory to determine how to reformat the data, and reformat the data (e.g., by decapsulating the data) as dictated by the information stored in memory. The wireless network 100 can then transmit the reformatted data to the external network 120. For example, the node 112 can receive the encapsulated data from the mobile device 102. The node 112 can transmit the encapsulated data along a communication pathway defined by one or more flow entries associated with one or more network hardware devices. The network hardware devices can transform the encapsulated data into a format usable by the external network, for example, by decapsulating the encapsulated data or adding an appropriate packet header. The network hardware devices can then transmit the reformatted data to the external network 120.

In block 512, network hardware devices of the wireless network 100 can receive data from the external network 120, access information stored in memory to determine how to reformat the data, and reformat the data (e.g., by encapsulating the data) as dictated by the information stored in memory. For example, the network hardware devices can transform the data into a format usable by the mobile device 102 by encapsulating the data or otherwise adding an appropriate packet header to the data. The wireless network 100 can then transmit the reformatted data to the node 112, which in turn can receive the reformatted data and transmit the reformatted data to the mobile device 102.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure.

What is claimed is:

1. A software-defined networking (SDN) system comprising:
   a processing device; and
   a non-transitory computer-readable medium in which instructions executable by the processing device are stored for causing the processing device to:
      receive a flow activation request from a service GPRS support node of a general packet radio service (GPRS) system in a wireless telecommunication network, wherein the flow activation request includes data extracted from a Packet Data Protocol (PDP) context request transmitted to the service GPRS support node by a mobile device; and
      in response to the flow activation request, transmit flow entry data to a plurality of programmable network hardware devices internal to the wireless telecommunication network and separate from the service GPRS support node, the flow entry data being configured for reprogramming the plurality of programmable network hardware devices to establish a communication pathway between the service GPRS support node and an external network, the communication pathway being exclusive of a gateway GPRS support node, and the communication pathway being configured for transmitting data packets between the mobile device and the external network via the service GPRS support node and the plurality of programmable network hardware devices.

2. The software-defined networking system of claim 1, wherein the flow entry data indicates that data packets transmitted through the communication pathway and specifying a first destination in the external network should be decapsulated prior to being transmitted to the external network, and that data packets transmitted through the communication pathway and specifying a second destination at the mobile device should be encapsulated prior to being transmitted to the mobile device.

3. The software-defined networking system of claim 2, wherein the flow entry data further indicates that data packets transmitted through the communication pathway and specifying the first destination in the external network should be decapsulated by removing a general packet radio service tunneling-protocol user (GTP-U) header, and that data packets transmitted through the communication pathway and specifying the second destination at the mobile device should be encapsulated by adding the GTP-U header.

4. The software-defined networking system of claim 2, wherein the non-transitory computer-readable medium further includes instructions executable by the processing device for causing the processing device to transmit the flow entry data to the plurality of programmable network hardware devices using an Openflow protocol, wherein the plurality of programmable network hardware devices include Openflow-compatible devices.

5. The software-defined networking system of claim 1, wherein the instructions are part of a software application configured to communicate with an SDN controller, the software application further comprising instructions executable by the processing device for causing the processing device to transmit commands to the SDN controller for causing the SDN controller to transmit the flow entry data over an Openflow protocol to the plurality of programmable network hardware devices.

6. A wireless telecommunication network comprising:
   a first GPRS support node for a general packet radio service (GPRS) system;
   a plurality of programmable network hardware devices configured to communicate data between the first GPRS support node and an external network, the plurality of programmable network hardware devices being separate from the first GPRS support node; and
   a software-defined networking (SDN) subsystem comprising a computing device that is separate from the plurality of programmable network hardware devices, the computing device being configured to transmit flow entry data to the plurality of programmable network hardware devices to establish a communication pathway between the first GPRS support node and the external network in response to a request from the first GPRS support node, the communication pathway excluding a second GPRS support node, and the communication pathway being configured for transmitting data packets between a mobile device and the external network via the first GPRS support node and the plurality of programmable network hardware devices.

7. The wireless telecommunication network of claim 6, wherein the request is a flow activation request;
   wherein the first GPRS support node is configured to:
      prior to transmitting the flow activation request to the SDN subsystem, receive a Packet Data Protocol (PDP) context request from the mobile device; and
      in response to receiving the PDP context request from the mobile device, transmit the flow activation request to the SDN subsystem, the flow activation request including data from the PDP context request; and
   wherein the SDN subsystem is configured to transmit a flow activation response to the first GPRS support node in response to the communication pathway being established, the flow activation response indicating to the first GPRS support node that the communication pathway was successfully established.

8. The wireless telecommunication network of claim 6, wherein the computing device is configured to transmit a flow table to at least one programmable network hardware device of the plurality of programmable network hardware devices to establish the communication pathway between the first GPRS support node and the external network; and
  wherein the flow table includes a flow entry indicating that data packets transmitted through the communication pathway and specifying a first destination in the external network should be decapsulated prior to being transmitted to the external network, and that data packets transmitted through the communication pathway and specifying a second destination at the mobile device should be encapsulated prior to being transmitted to the mobile device.

9. The wireless telecommunication network of claim 8, wherein the flow entry indicates that data packets transmitted through the communication pathway and specifying the first destination in the external network should be decapsulated by removing a general packet radio service tunneling-protocol user (GTP-U) header, and that data packets transmitted through the communication pathway and specifying the second destination at the mobile device should be encapsulated by adding the GTP-U header.

10. The wireless telecommunication network of claim 6, wherein:
  the first GPRS support node is a service GPRS support node or a gateway GPRS support node;
  the communication pathway includes multiple data packet tunnels;
  the computing device is executing a SDN controller for receiving the request from the first GPRS support node and controlling the plurality of programmable network hardware devices using an OpenFlow protocol;
  the plurality of programmable network hardware devices comprises an Openflow switch or an Openflow router; and
  the external network includes the Internet.

11. The wireless telecommunication network of claim 6, wherein the computing device comprises an executable software application that is configured for selectively controlling how the communication pathway is established through the wireless telecommunication network and among the plurality of programmable network hardware devices.

12. The wireless telecommunication network of claim 6, wherein the wireless telecommunication network excludes the second GPRS support node.

13. A method comprising:
  receiving, by a first GPRS support node of a general packet radio service (GPRS) system of a wireless telecommunication network, a Packet Data Protocol (PDP) context request from a mobile device;
  in response to receiving the PDP context request from the mobile device, transmitting, by the first GPRS support node, a flow activation request to a computing device executing a software application for controlling a plurality of programmable network hardware devices that are internal to the wireless telecommunication network;
  receiving, by the computing device, the flow activation request from the first GPRS support node;
  in response to receiving the flow activation request from the first GPRS support node, establishing, by the computing device, a communication pathway for transmitting data packets between the first GPRS support node and an external network by transmitting flow data to the plurality of programmable network hardware devices indicating a route for the data packets to traverse through the plurality of programmable network hardware devices, wherein the communication pathway excludes a second GPRS support node; and
  subsequent to establishing the communication pathway, routing the data packets, by the first GPRS support node and the plurality of programmable network hardware devices, between the mobile device and the external network via the communication pathway.

14. The method of claim 13, further comprising:
  configuring the plurality of programmable network hardware devices to decapsulate data packets transmitted by the mobile device and specifying a first destination in the external network and encapsulate data packets transmitted by the external network and specifying a second destination corresponding to the mobile device.

15. The method of claim 13, further comprising, subsequent to establishing the communication pathway:
  transmitting, by the software application, a flow control response to the first GPRS support node indicating that the communication pathway was successfully established;
  receiving, by the first GPRS support node, the flow control response; and
  in response to receiving the flow control response, transmitting, by the first GPRS support node, an indication that the PDP context request was accepted to the mobile device.

16. The method of claim 13, wherein routing the data packets via the communication pathway comprises:
  receiving, by the first GPRS support node, the data packets from the mobile device;
  transmitting, by the first GPRS support node, the data packets to the plurality of programmable network hardware devices;
  transforming the data packets, by the plurality of programmable network hardware devices, into reformatted data packets to make the data packets compatible with the external network; and
  transmitting, by the plurality of programmable network hardware devices, the reformatted data packets to the external network.

17. The method of claim 13, wherein routing the data packets via the communication pathway comprises:
  receiving, by the plurality of programmable network hardware devices, the data packets from the external network;
  transforming the data packets, by the plurality of programmable network hardware devices, into reformatted data packets to make the data packets compatible with the mobile device;
  transmitting, by the plurality of programmable network hardware devices, the reformatted data packets to the first GPRS support node;
  receiving, by the first GPRS support node, the reformatted data packets; and
  transmitting, by the first GPRS support node, the reformatted data packets to the mobile device.

18. The method of claim 13, wherein the software application is executing on a cloud server in a cloud computing environment for remotely controlling a data flow through the wireless telecommunication network.

19. The method of claim 13, wherein the wireless telecommunication network does not include the second GPRS support node.

20. The wireless telecommunication network of claim 6, wherein the plurality of programmable network hardware devices are positioned between the first GPRS support node and the external network.

* * * * *